Figure 5:
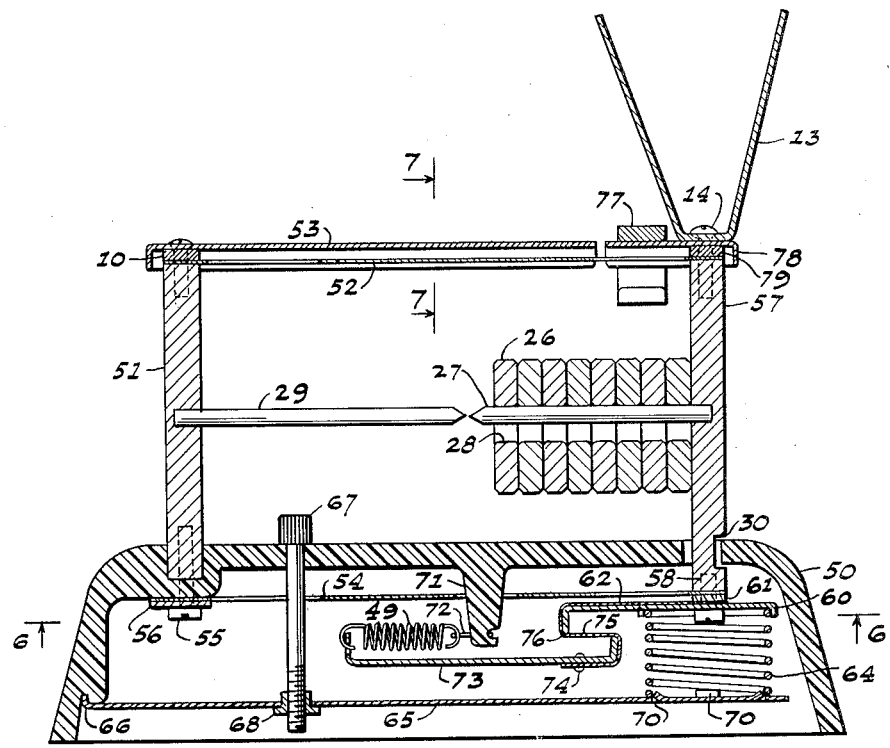

Jan. 17, 1956     W. STELZER     2,731,255
WEIGHING MECHANISMS
Filed Nov. 25, 1953     3 Sheets-Sheet 1
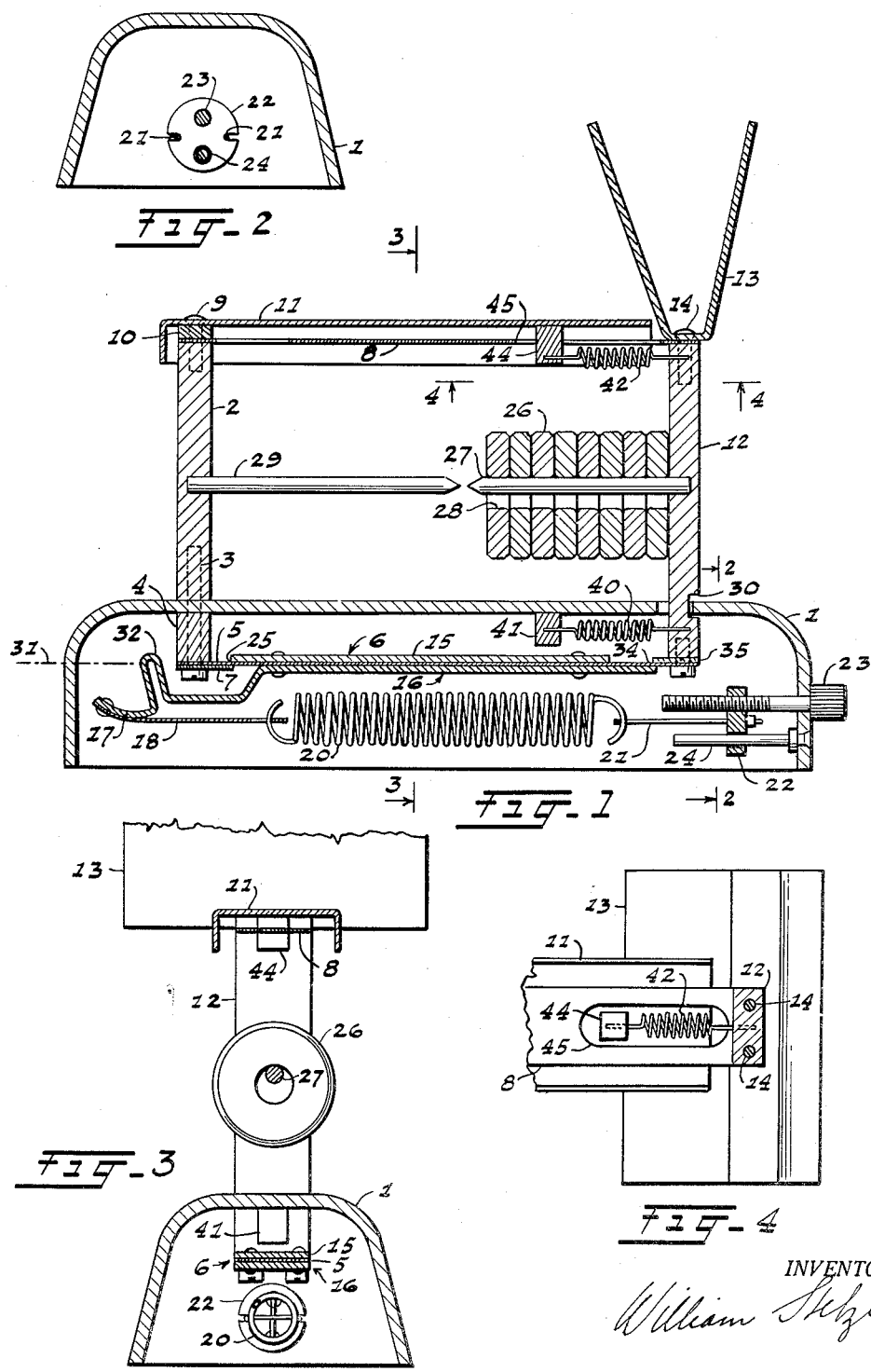
INVENTOR.
William Stelzer Jan. 17, 1956     W. STELZER     2,731,255

WEIGHING MECHANISMS

Filed Nov. 25, 1953     3 Sheets-Sheet 2

INVENTOR.
William Stelzer

Jan. 17, 1956 W. STELZER 2,731,255
WEIGHING MECHANISMS
Filed Nov. 25, 1953 3 Sheets-Sheet 3
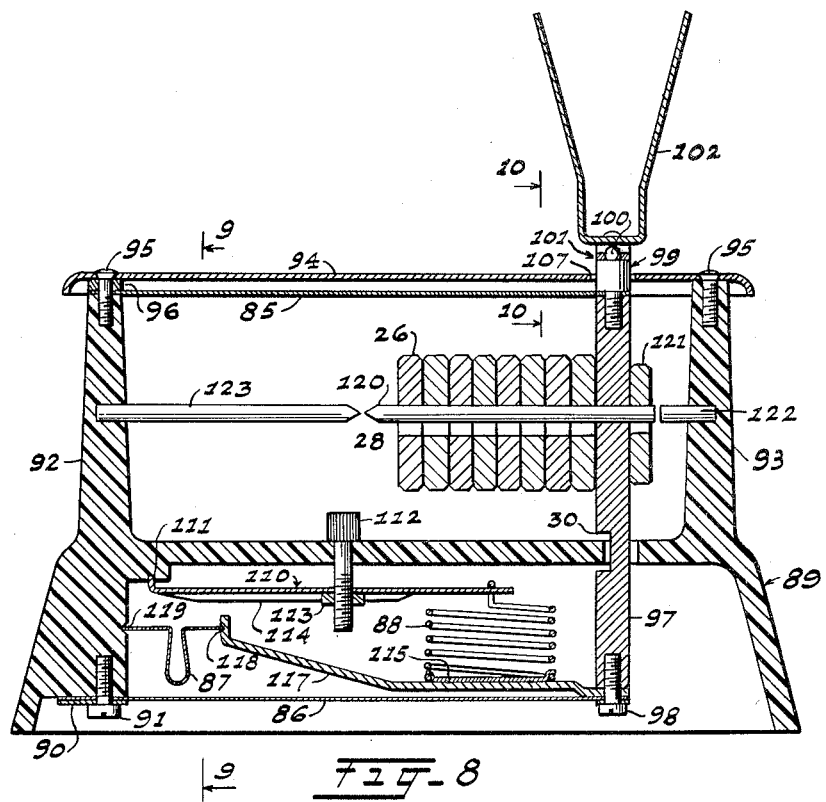
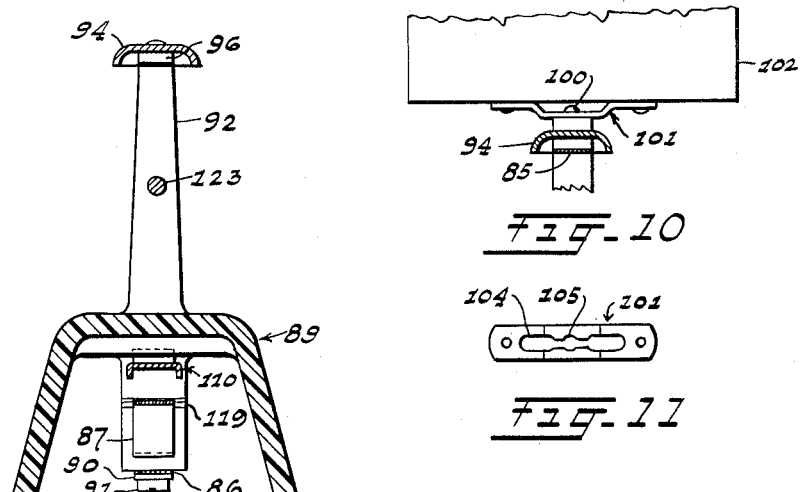
INVENTOR.
William Stelzer United States Patent Office 2,731,255
Patented Jan. 17, 1956

2,731,255

WEIGHING MECHANISMS

William Stelzer, Summit, N. J.

Application November 25, 1953, Serial No. 394,344

5 Claims. (Cl. 265—63)

The invention relates to weighing mechanisms and more particularly to a weighing mechanism using spring means as a resistant with complemental or counterweights that can be added or removed from the load.

This application is a continuation-in-part of my application Serial No. 180,620, filed August 21, 1950, now Patent 2,681,222. It is also related to my co-pending application Serial No. 345,813, filed March 31, 1953, now Patent 2,698,747.

The object of the invention is to produce a novel weighing mechanism suitable for use as a postal scale or letter weigher giving a positive indication of the weight of the article weighed, in contrast to spring scales or weighers using pendulous weights where the marginal readings depend on the interpretation of the observer.

Another object is to provide resilient or flexible check links for obtaining a vertical motion of the load carrying member, and to arrange the spring type resistant and linkage in such a manner as to produce a constant force opposing the gravitational force acting on the load carrying member, so that the latter is balanced at any point of its vertical path when it carries all the counterweights and no load.

Another object is to provide means to put the check links under tension to permit the use of thin and highly flexible bands to serve as check links; such means serving at the same time to fully or partly compensate for the rate of the spring type resistant.

Figure 6:
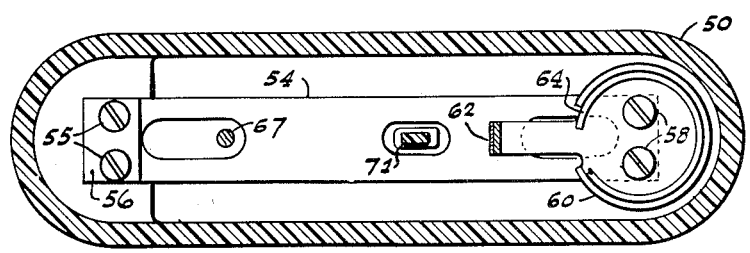
Figure 7:
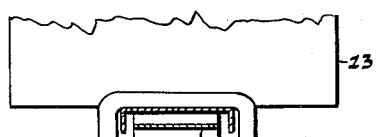

Other objects and advantages of this invention will be apparent from the following description considered in connection with the accompanying drawings submitted for the purpose of illustration and not to define the scope of the invention, reference being had for that purpose to the subjoined claims. In the drawings, wherein similar reference characters refer to similar parts throughout the several views:

Fig. 1 is a sectional elevation of the novel weigher constructed as a letter scale;

Fig. 2, a section taken on lines 2—2 of Fig. 1;

Fig. 3, a section taken on lines 3—3 of Fig. 1;

Fig. 4, a section taken on lines 4—4 of Fig. 1;

Fig. 5, a sectional elevation showing a weigher of a modified construction;

Fig. 6, a section taken on lines 6—6 of Fig. 5;

Fig. 7, a section taken on lines 7—7 of Fig. 5;

Fig. 8, a sectional elevation of a weigher showing a further modification;

Fig. 9, a section taken on lines 9—9 of Fig. 8;

Fig. 10, a section taken on lines 10—10 of Fig. 8; and

Fig. 11, a plan view of one part shown in detail.

Before explaining the present invention in detail, it is to be understood that the invention is not limited in its application to the details of construction and arrangement of elements illustrated in the accompanying drawings, since the invention is capable of other embodiments and of being practised or carried out in various ways. Also it is to be understood that the phraseology or terminology employed herein is for the purpose of description and not limitation.

Referring now to the drawing, the novel weigher comprises a base 1 to which is secured a vertical post 2 by means of screws 3 with a spacer 4 and a flexible ribbon 5 of a check link 6, as well as a rectangular washer 7, interposed. Another check link 8 consisting of a leaf spring or metallic band has one end secured to the top of post 2 by means of screws 9 which also secure a spacer 10 and protective cover 11. The free or movable ends of the two horizontal and parallel check links 6 and 8 have secured to them a vertical load carrying member or spider 12 carrying a V-shaped tray 13 secured by means of screws 14, link 8 being clamped between load carrying member 12 and tray 13. The two check links swing a short distance in an arcuate path to constrain load carrying member 12 to move vertically where all points of the latter move at equal velocity. The lower check link 6 is reinforced with a plate 15 and a portion of an arm 16, both being riveted together with ribbon 5 sandwiched between. The curved free end 17 of arm 16 extends a distance beyond the line or area of flexure of ribbon 5 near post 2 towards the opposite side of the latter, or in a direction away from member 12, and has attached to it a flexible ribbon 18 connected to one end of a helical tension spring 20 serving as the resistant for the weighing scale. The other end of spring 20 is fastened by means of a cord or other flexible element 21 to a nut 22 engaged by an adjusting screw 23. A stud 24 riveted to base 1 and passing through a hole of the nut keeps the latter from turning when adjusting screw 23 is rotated.

The force of spring 20 produces a turning moment about the point of flexure at or near 25 to result in an upward force acting on load carrying member 12 which carries the complemental or counterweights 26 supported by a horizontal support or shelf in the shape of a pin 27, weights 26 having central holes 28 to slide on pin 27 so that they can be shifted from pin 27 onto an opposite pin 29 supported by post 2.

Spring 20 is so adjusted or of such strength that the vertical lifting force produced by it counterbalances the gravitational force acting on load carrying member 12 when all counterweights are supported on pin 27 and there is no load on tray 13. To obtain maximum sensitivity of the weigher, it is desirable that a balance exists throughout the vertical travel of load carrying member 12, this travel being limited by notch 30. To compensate for the rate of spring 20, as well as for the variable resistance of check links 6 and 8, the curved portion 17 of arm 16 is so disposed that when spring 20 contracts during the ascent of load carrying member 12, the leverage with which spring 20 produces a turning moment is increased proportionately with the movement. The desired result is best obtained if the curvature of end 17 equals an arc described by a radius whose locus is at or near line 31 which is a projection of the centerline of check link 6. The compensating action is greater if the locus of the radius is farther to the left of the point of flexure 25. By changing the distance between point 25 and the locus of the radius, the compensating action can be adjusted. For this purpose I provide a loop 32 in arm 16 which can be bent at various places until the desired adjustment is obtained. Such an adjustment needs to be made only once, when the weigher is manufactured.

Ribbon 5, which should have good tensile strength, is preferably made of very thin and flexible material so that the resistance to bending is reduced to a minimum, because the flexure of ribbon 5 is confined to a very small area at 25 and at 34. At the latter place the downward force of load carrying member 12 is transmitted to arm 16 by a rectangular plate 35. Reinforcement 15 similarly transmits the downward force to fixed washer 7 so that no bending stresses occur in ribbon 5 that are due to support of member 12; but spring 20 places ribbon 5 near post 2 under tension. At the other end ribbon 5 is in tension due to a helical compression spring 40 having one end fixed in bracket 41 extending from base 1 and the other engaging member 12. The ends of spring 40 are preferably co-axial with the spring and firmly held in their supports, as by being pressed into a snug hole. Check link 8 may be similarly put under tension by a compression spring 42 similar to spring 40 and supported at one end by a bracket 44 extending downwardly from cover 11. An oblong clearance hole 45 in check link 8 serves to accommodate bracket 44, and another such hole may be provided at the other end of link 8 to limit bending to the end portions.

Springs 40 and 42 not only place links 6 and 8 in tension, but they also tend ot compensate for the rate of spring 20 and the bands of the check links.

The modified form of the invention shown in Fig. 5 illustrates that in place of compression springs 40 and 42 described above, a tension spring 49 can be employed with a similar result, though in the position shown only the lower link is placed in tension. The construction of the modified letter scale is in many parts the same so that these need not be again described. Base 50, preferably of plastic, supports a fixed post 51 to which is attached an upper check link 52 and spaced cover 53. A lower horizontal check link 54 parallel with link 52 has one end secured to base 50 by means of a screw 55 and washer 56 which also serve to secure post 51. The movable ends of links 52 and 54 have secured to them a load carrying member 57 by screws 14 and 58 respectively, the latter also securing a spring seat 60 with a spacer 61 and the end of a flexible ribbon 62 interposed between link 54 and spring seat 60. The latter is engaged by a helical compression spring 64 resting on a plate 65 pivoted at 66 and adjustable by an adjusting screw 67 engaging a grommet nut 68 anchored in a square hole in plate 65 so that the nut cannot turn. Spring 64, which serves as the resistant, is located on plate 65 by small tabs 70 struck out of the plane of plate 65.

Spring 49 has one end tied to a lug 71 extending from base 50 by means of a flexible link 72, and the other end of spring 49 is hooked to one end of a horizontal link 73 whose purpose is to transmit the force of spring 49 to load carrying member 57 through the medium of flexible ribbon 62 and spring seat 60, thereby placing link 54 under tension. One extremity of flexible ribbon 62 is secured to link 73 by means of rivets 74. In the arrangement shown, portion 75 of ribbon 62 is under tension, flexure taking place at 76 and in flexible link 72.

In a letter scale, weights 26 would each be one ounce, since this is the unit to which the postal rates apply. By adding a half ounce weight 77 supported by cover or arm 78 clamped between platter 13 and spacer 79, it is possible to weigh in steps of half ounces.

In the modification shown in Fig. 8, both upper and lower check links 85 and 86 are placed under tension by a single spring 87, which in this embodiment also serves to compensate for the rate of the resistant, the latter being in the form of a tension spring 88. The lower check link 86 is clamped at one end to a frame or base 89 by means of a washer 90 and screw 91, and the upper check link 85 has one end secured to the top of one of a pair of vertical posts 92 and 83 extending upwardly from base 89. The two posts are braced together by a cover 94 held down by screws 95, one of which serves for securing link 85, a spacer 96 being interposed. The two check links are preferably in the form of metallic bands which may swing vertically in an arcuate path. The free ends are tied to a vertical load carrying member or spider 97 by means of screws 98 and 99, the latter being a special kind having a head with a spherical portion 100 on top to be engaged by a snap fastener 101 riveted to the underside of a tray 102. Snap fastener 101 consists of a leaf spring shown in detail in Fig. 11. The elongated slot 104 causes the yieldability of the central aperture 105 so that the ball portion 100 snaps into it. Thus tray 102 can be quickly attached or removed. The main purpose of the fastener is to prevent damage to the scale if tray 102 is accidentally jarred, as any excessive force on tray 102 simply detaches the latter so that no damaging strain can be transmitted to links 85 and 86. The latter can resist considerable tension, and other excessive forces merely cause them to yield resiliently until load carrying member 97 comes to rest against the wall of hole 107 in cover 94.

Resistant 88, which consists of a tension spring, has its upper end hooked to a lever 110 pivoted at 111 to base 89 and adjustably held by an adjusting screw 112 engaging a square nut 113 prevented from turning by the downturned side flanges 114 of lever 110.

The lowest coil of spring 88 is held down by tabs of a disc 115 welded or otherwise secured to a stiff arm 117 extending from load carrying member 97. This arm 117 has a V-shaped notch 118 serving as a bearing for the knife-edge end of spring 87. The other end of the latter pivots in a similar notch 119 in base 89. Spring 88 opposes the gravitational force of load carrying member 97 supporting the counterweights 26 resting on pin 120 which projects through member 97 to support a smaller weight 121 on the other side. This smaller weight can be shifted onto a fixed pin 122 projecting from post 93, and weights 26 can be shifted onto a fixed support in the form of a pin 123 extending horizontally from post 92. Pins 120 and 123 have chisel-point ends serving as indicating means. They are in alignment with each other when in an intermediate position of the vertical travel of member 97. Spring 87 serves to compensate for the change in the force of resistant 88 so that the weigher is in balance throughout the vertical stroke of member 97 when all weights are supported by member 97 and there is no load on platter 102.

In operation, when an article is placed on the tray of the adjusted scale, counterweights 26 are shifted onto the fixed support until the load carrying member rises to the top position. The removed weights are equal to the weight of the article on which postage must be figured.

Springs 40 and 42 of Fig. 1, spring 49 of Fig. 5, and spring 87 of Fig. 8, all work on the same principle, serving mainly to place the check links under tension and at the same time either fully or partly compensating for the rate, or change in the force of the spring serving as the resistant. The principle is most apparent in Fig. 8. In the intermediate or index position where pins 120 and 123 are aligned, the pivoted end portions of spring 87 are horizontal or at the same elevation. The spring thus transmits a horizontal force against member 97. With travel of member 97 up or down, an upward or downward component is added besides the horizontal force. Thus in the upward movement from the index position spring 88 becomes weaker in proportion to the distance travelled, at the same time the upward component produced by spring 87 increases and thereby compensates for the loss of force of spring 88. In the downward movement of member 97 from the index position spring 88 increases in force, but a downward component is produced by spring 87 to compensate for the increase. While theoretically the compensation is not perfect, mainly due to the rate of the compensating spring itself, the error is so small as to be practically not noticeable if the vertical movement of the load carrier is held reasonably short.

Springs 40 and 42 of Fig. 1, while placing the check links under tension, are less efficient in compensating for the rate of the spring type resistant, because springs 40 and 42 offer a resistance against the distortion of their axes as the terminal wires remain in a horizontal position throughout the stroke of member 12. This resistance is subtracted from the upward or downward component produced by the expansion of springs 40 and 42 in the movement of member 12 away from the index position. The compensating force could be increased by increasing the diameter of the coils, but in this case it is not necessary because spring 20 is arranged to compensate for its rate itself.

The compensating means shown in Fig. 5 are more efficient due to the flexibility of link 72 and ribbon 62, though the principle is the same. It is apparent that a spring similar to spring 42 could be used in addition to place link 52 under tension, or link 54 could be positioned below spring 49 as illustrated in principle in Fig. 8, whereby both links 52 and 54 would be placed under tension by spring 49.

Having thus described my invention, I claim:

1. A weighing mechanism comprising a stationary frame, a pair of spaced horizontal parallel check links arranged one above the other consisting of flexible bands having good tensile strength, each having one end secured to said stationary frame, a load carrying member comprising a tray to carry a load to be weighed, said load carrying member being secured to the other ends of said check links so that said load carrying member is constrained to move vertically where all points of said load carrying member have equal velocity, a plurality of removable counterweights of known weight supported by said load carrying member, a spring type resistant arranged to act vertically to oppose the gravitational force acting on said load carrying member, and means located intermediate said check links and exerting a normally horizontal force against said load carrying member to place both of said check links under tension.

2. The construction as claimed in claim 1, where said last named means consists of a normally horizontally disposed compression spring having one end fixed to said frame and the other secured to and acting against said load carrying member in a direction to place both of said check links under tension, whereby movement of said load carrying member causes said compression spring to swing in an arcuate path from its normal horizontal position and thereby produce a vertical component force acting on said load carrying member to compensate for the rate of force of said spring-type resistant.

3. A weighing mechanism comprising a stationary frame, a pair of spaced horizontal parallel check links arranged one above the other consisting of flexible bands having good tensile strength, each having one end secured to said stationary frame, a load carrying member comprising a tray to carry a load to be weighed, said load carrying member being secured to the other ends of said check links so that said load carrying member is constrained to move vertically where all points of said load carrying member have equal velocity, a plurality of removable counterweights of known weight supported by said said load carrying member, at least one horizontal support extending from said load carrying member to support said counterweights, a fixed support extending from said frame in approximate alignment with said first mentioned support whereby said counterweights can be shifted from said first support to said fixed support, a spring-type resistant arranged to act vertically and to oppose the gravitational force acting on said load carrying member, and means to compensate for the rate of said spring-type resistant so that said load carrying member is balanced at any point of its vertical travel when said counterweights are supported by said load carrying member and no load is on said tray, said means including at least one spring positioned intermediate said check links to place both of said check links under tension.

4. The construction as claimed in claim 3, where said tray is secured by a snap fastener to be easily removable, and to yield if excess forces are applied to said tray, to prevent damage to said weighing mechanism.

5. A weighing mechanism comprising a stationary frame, a pair of spaced horizontal parallel check links arranged one above the other consisting of flexible bands having good tensile strength, each having one end secured to said stationary frame, a load carrying member comprising a tray to carry a load to be weighed, said load carrying member being secured to the other ends of said check links so that said load carrying member is constrained to move vertically where all points of said load carrying member have equal velocity, a plurality of removable counterweights of known weight supported by said load carrying member, a spring type resistant arranged to act vertically to oppose the gravitational force acting on said load carrying member, and means for securing said tray to said load carrying member, said means comprising a snap fastener so that said tray is easily removable and to be able to yield if excessive forces are applied to said tray, to prevent damage to said weighing mechanism.

References Cited in the file of this patent

UNITED STATES PATENTS

| Re. 20,137 | Hartley | Oct. 20, 1936 |
| 2,331,904 | Gustafsson et al. | Oct. 19, 1943 |
| 2,681,222 | Stelzer | June 15, 1954 |

FOREIGN PATENTS

| 739,948 | France | Nov. 3, 1932 |
| 240,043 | Germany | Oct. 19, 1883 |